MOLDING MACHINES

Original Filed Feb. 28, 1961 4 Sheets-Sheet 1

INVENTOR
MIKIHIKO HANAI
BY
Oldham & Oldham
ATTORNEYS

MOLDING MACHINES

Original Filed Feb. 28, 1961 4 Sheets-Sheet 2

INVENTOR.
MIKIHIKO HANAI
BY
Oldham & Oldham
ATTORNEYS

MOLDING MACHINES

Original Filed Feb. 28, 1961 4 Sheets-Sheet 3

INVENTOR.
MIKIHIKO HANAI
BY
Oldham & Oldham
ATTORNEYS

MOLDING MACHINES

Original Filed Feb. 28, 1961 4 Sheets-Sheet 4

INVENTOR.
MIKIHIKO HANAI
BY
Oldham & Oldham
ATTORNEYS

United States Patent Office

Re. 26,045
Reissued June 28, 1966

26,045
MOLDING MACHINES

Mikihiko Hanai, 2 11-chome, Tsukishima-Higashinakadori, Chuo-ku, Tokyo, Japan

Original No. 3,210,805, dated Oct. 12, 1965, Ser. No. 92,307, Feb. 28, 1961. Application for reissue Feb. 1, 1965, Ser. No. 532,501
5 Claims. (Cl. 18—20)

Matter enclosed in heavy brackets [ ] appears in the original patent but forms no part of this reissue specification; matter printed in italics indicates the additions made by reissue.

This invention relates to a molding machine for plastic packings *or caps,* and more particularly to a molding machine for rapid and automatic production of plastic packings [interposing] *interposed* between a bottle mouth and a crown cap or other caps.

It has heretofore been usual in the ordinary injection type molding machine or method that about three-fourths of material employed is [wated] *wasted* and the method itself is very inefficient.

One object of this invention is to provide a molding machine for *making* plastic packings *or caps* from plastic tape in a [gel] *workable* condition by which said enormous loss of the material used can be eliminated and plastic packings best adapted to requirements can be produced at very high speed.

Another object of this invention is to provide an improved molding machine for plastic packings in which said plastic packings are molded between the two press molds arranged within the concentric cylinders by way of the reciprocal movement, i.e., forward and backward movements of these two press molds.

A further object of this invention is to provide an improved plastic packing to be interposed between a bottle mouth and a crown cap or other caps.

Other objects and features of this invention will become apparent on the reading of the following specification and claims in conjunction with the drawings.

Accordingly, the present molding machine in its preferred form consists of an extrusion disc and a coupling disc, both of which being mounted on a horizontal shaft driven freely and which comprising a number of cylinders provided around a fringe of each disc systematically with certain intervals so as to face to each other and each piston having a press mold on its tip being inserted in each of these cylinders to be slidable freely in an axial direction. These pistons in the cylinders of both extrusion disc and coupling disc according to the present molding machine are adapted to carry out three movements during [a half] *the* rotation of these discs, i.e. (1) forward movement of the extrusion piston, (2) backward movement of the extrusion piston and forward movement of the coupling piston and (3) backward movement of both so that [gel-formed] *the workable* plastic tape supplied gradually at one end of the row of pistons into the press mold by means of this systematic movement of pistons may be either cut to a desired size or pushed [out at] *into* the other [end of the] row of pistons so as to form desired plastic [packings] *articles* [, while a material remaining in the mold as residue may be scraped off constantly].

In order that the invention may be readily carried into effect, it will now be described with reference to the embodiment and the attached drawings, in which—

Figure 8:
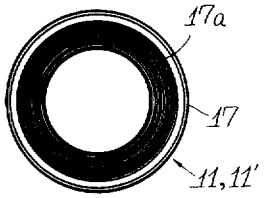
Figure 9:
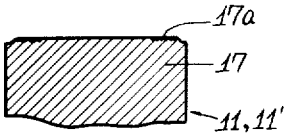
Figure 10:
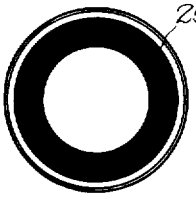
Figure 11:
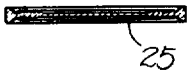
Figure 7:
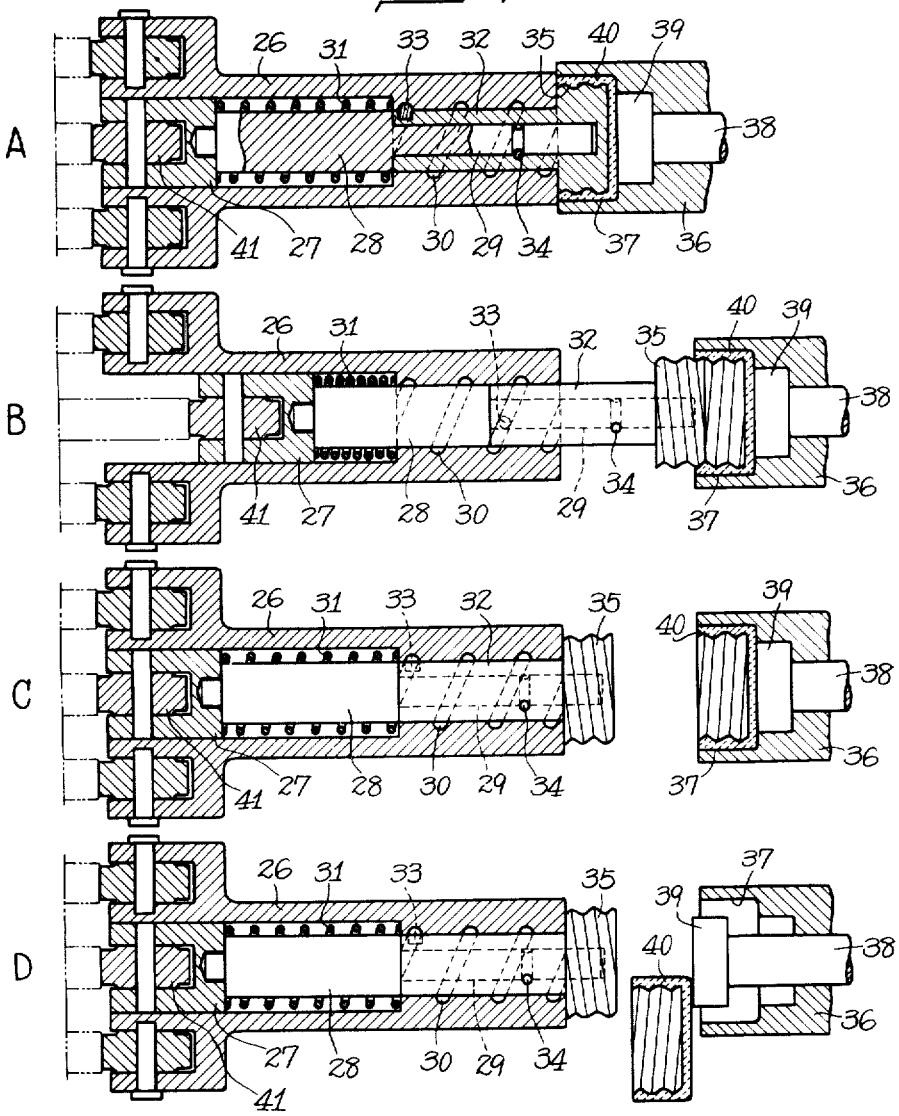

FIGS. 6A, B, C and D are the enlarged views of the disc portions of this molding machine, and in which drawings the change positions of the discs during one cycle of operation of the machine are shown;

FIGS. 7A, B, C and D are enlarged views of other embodiments of cylinders and press molds used for molding caps and the like, these views also illustrating mechanisms used in the operation;

FIG. 8 is a plan view of a press mold;

FIG. 9 is a sectional view of the press mold of FIG. 8;

FIG. 10 is a plan view of the plastic packing produced with the machine of the invention, and FIG. 11 is a sectional elevation of the plastic packing of FIG. 10.

The invention will be more clearly understood from the following description of an illustrative embodiment thereof, reference being made to the accompanying drawings.

Figure 2:
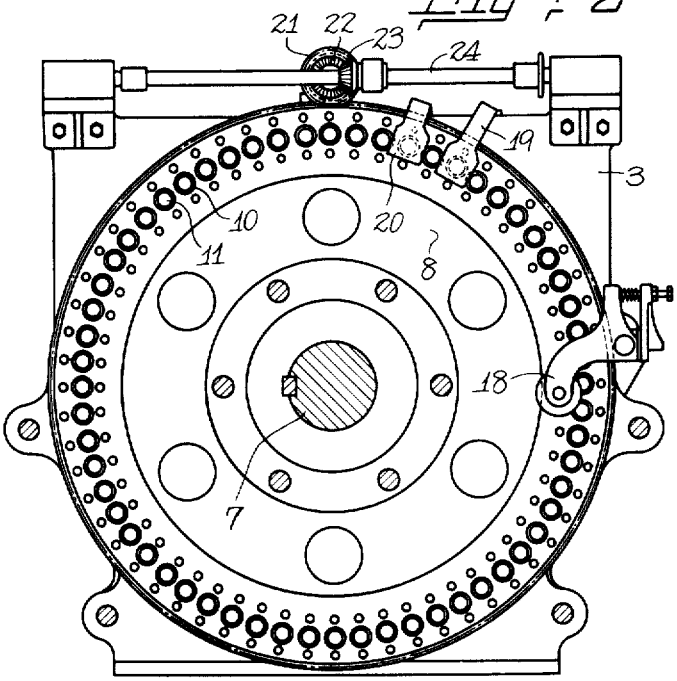
FIG. 2 is a right side elevation of the machine shown in FIG. 1 *with portions of the machine removed and with some parts shown in vertical section;*

Referring *to* the drawings, there are arranged bearings 5 and 6 through the center of fixed plates 3 and 4 (see FIG. 3) which are secured to the base (not shown) by means of legs 1 and 2. A shaft 7 is rotatably supported through the bearings 5 and 6. Said shaft 7 is driven by means of a suitable transmission gear (not shown) to rotate in a counter-clockwise direction, *as shown in FIG. 2,* while its speed is adjusted in a desired manner [as shown in FIG. 2]. There are mounted two discs, one a coupling disc 8 and the other an extrusion disc 9 on the shaft 7 between these bearings 5 and 6. These discs 8 and 9 being connected, are adapted to rotate concurrently together with the shaft 7, while peripheries of these discs keep proper distance with each other and also with the fixed plates 3 and 4.

Figure 3:
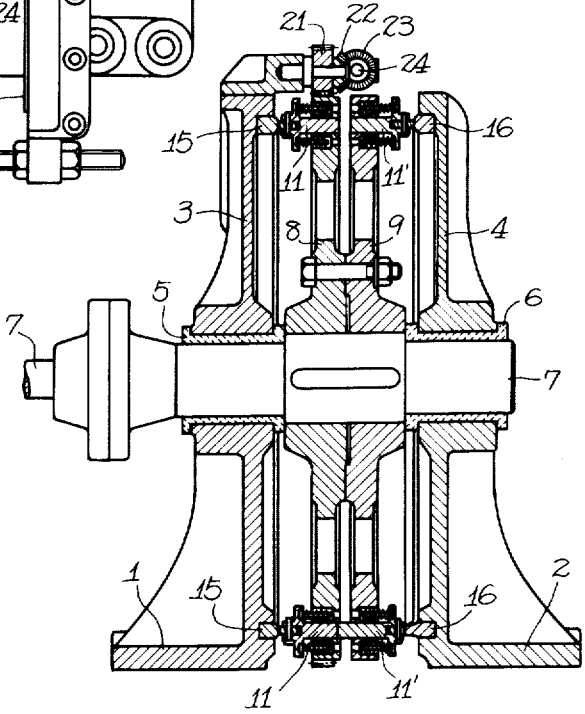
FIG. 3 is a sectional elevation of the present machine, as viewed from the front.
Figure 6:
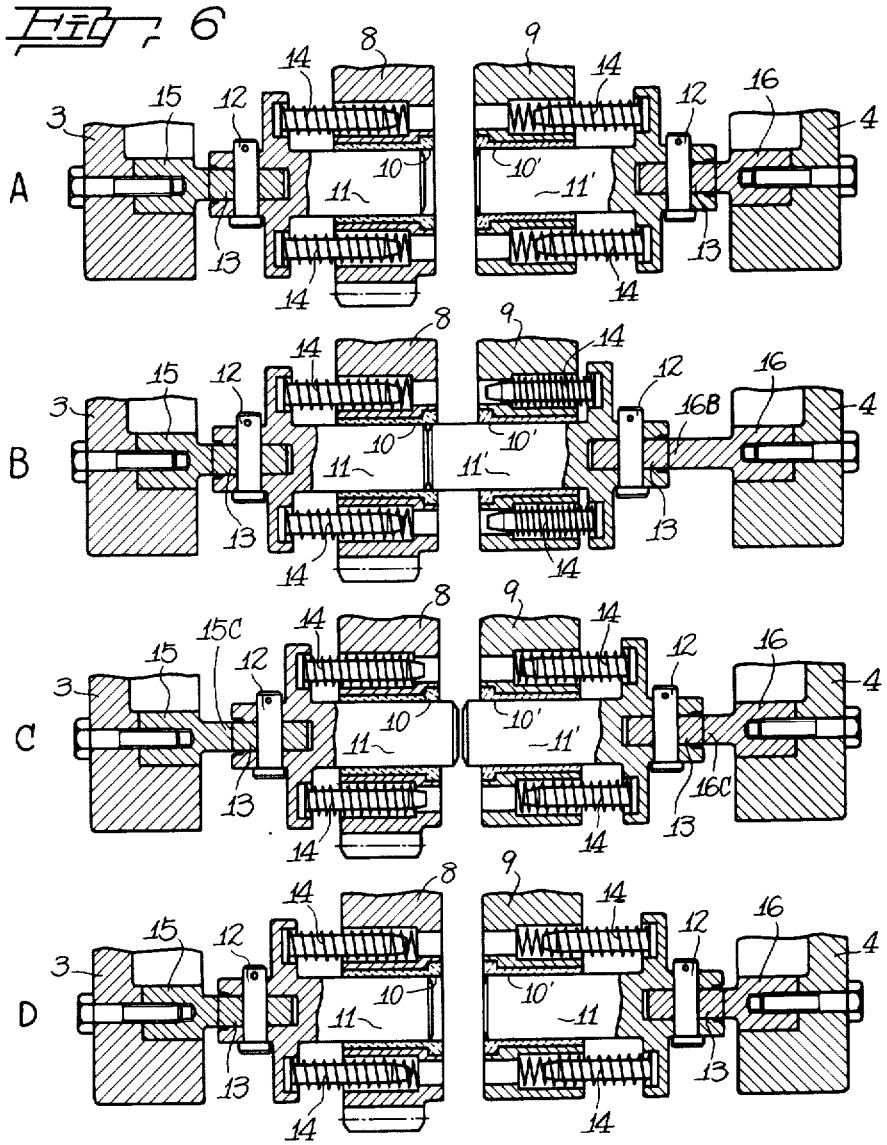

Around the fringes of discs 8 and 9 there are formed 60 cylinders 10 and 10', all being *of the* same shape and at equal distance and extending parallel to the shaft 7. The same shaped pistons 11 and 11' are slidably set into each of these cylinders 10 and 10', respectively. Behind these pistons 11 and 11' there are arranged rollers 13 freely rotatable on pins 12, also springs 14 being attached to each cylinder. These springs serve to hold the moving pistons 11 and 11' backward in the cylinders as shown in FIG. 6. Along the peripheries of discs 8 and 9, there are cams 15 and 16 secured to the plates 3 and 4 as shown in FIG. 3.

Figure 4:
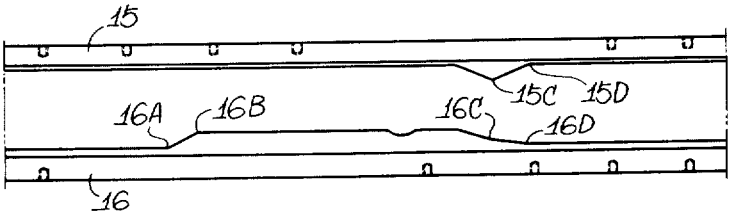
FIG. 4 is a developed view of [a cam] *a portion of the cams* as shown in FIG. 3.

FIG. 4 is a developed view of the cams 15 and 16, indicating the highest points at right and left ends and at the center the lowest point, that is to say, the cam 15 is raised once at the lower right point 15C, as seen in FIG. 4, while the cam 16 is raised at a little lower left point of the point 16B as in FIG. 2, keeping its raised position as against the right [hight] *height* point of the cam 15C and then drops at 16C.

Figure 5:
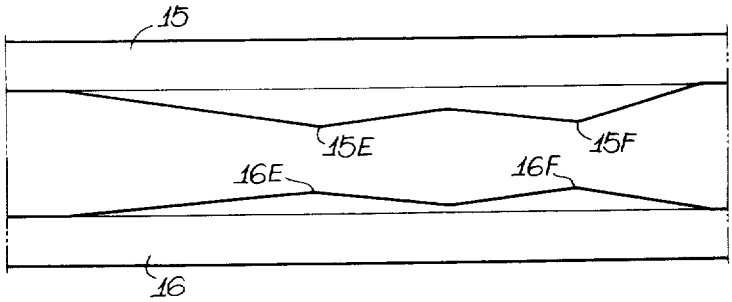
FIG. 5 is also a developed view of [an] *the* upper [half] *halves* of said [cam] *cams;*

The cams 15 and 16 being so arranged that the roller 13 may be always pressed therewith and by the action of a spring 14 the roller 13 can rotate according to the aforementioned concave and convex portions of the cams, thus reciprocating slidably the pistons 11 and 11' inside the cylinders in conformity with the rotation of the discs 8 and 9. The plastic tape [25] is adapted from its one end to be inserted between each pair of pistons in succession [, and one edge of this plastic tape is made thicker than the other edge]. Explaining now its movement with reference to FIG. 6, it may be seen that pistons 11 and 11' of discs 8 and 9 being arranged all in pairs, during semi-circular course of their movement on the cams 15 and 16 (*FIGS. 4 and 5*), then piston 11' of the extrusion side retreats to the point 16C and the piston 11 of the coupling side pushes out to the point [16C] *15C* as shown in FIG. 6 and subsequently at the point of both pistons 11 and 11' retreat to their original positions (see FIG. 6D). During this process, [gel-formed] *the* workable plastic tape [25] is cut to a desired size to form proper shapes with rings on fringe grooves impressed by a press mold 17 (FIGS. 8 and 9) having a circular stripe 17a at the end of the piston 11 on the coupling side, and subsequently they are carried on to a push-out device 18 at the right side in FIG. 2, where they are forced out as finished plastic packings having the structure illustrated in FIGS. 10 and 11. In the course of these steps, air is preferably blown therethrough by means of a blower (not shown) to cool the plastic packings.

Figure 1:
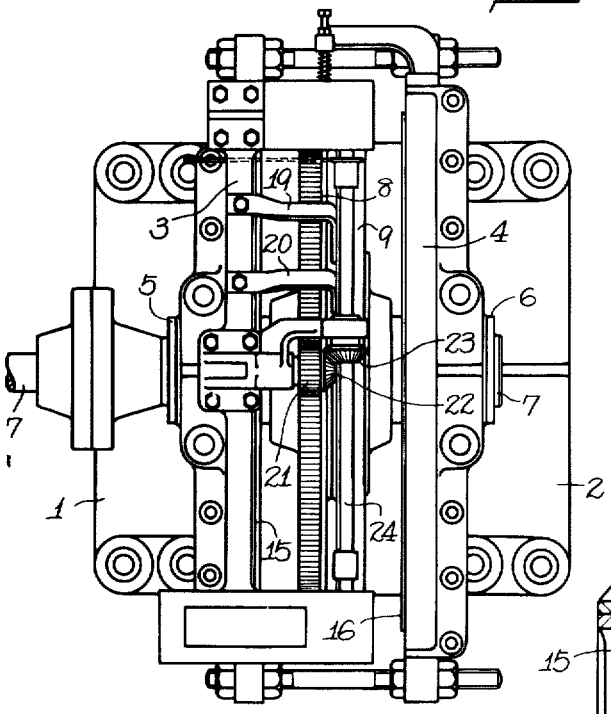
FIG. 1 is a top plan view of an embodiment of the present molding machine in accordance with this invention.

In the meantime, the packing material which still remains stuck on the mold 17 is carried on from the right end to the left upper portion so that it can be scraped off by special scraping devices 19 and 20, as shown in FIGS. 1 and 2. Then the cams 15 and 16 and their opposing cams 15E and 15F, 16F being projected (see FIG. 5), pistons 11 and 11' are pushed out and by the scraping *of scrapers* 19 and 20, [the] *any* residues are scraped [out] *off*. Furthermore, as the edge of the coupling disc 8 is in the form of a gear, it, working conjointly with a small gear 21, is adapted to rotate a pair of bevel gears 22 and 23 and move the horizontal shaft 24. In this way, an extruding device (not shown) for plastic tape [25] can be controlled by the edge of said coupling disc 8.

In case of molding the plastic cap in accordance with this invention, the cylinders 10 and 10' and pistons 11 and 11' are substituted with other ones respectively. More particularly, an inner diameter of the latter portion of a cylinder 26 (FIG. 7) is enlarged, within which a [diameter of a] piston 28 [wound] *urged axially outwardly* by a spring 31 is [made small] *received. The piston 28 has a reduced diameter at its axially inner end 29.* A cylindrical leg 32 having a projection 33 at its inner end and having the same outer diameter with the piston [23] *28* is inserted into [a] *the* cylinder 26, [both] *the leg 32 and the piston end 29* being *rotatably* secured *together* by a pin 34. A male mold 35 having a spirally projected groove around its outer periphery is secured to the [cylinder 26] *piston end 29 by pin 34.* Moreover, a spiral groove 30 is provided around an inner surface of the front portion of the cylinder 26 so that in accordance with the forward and backward movements of the projection 33 through said groove 30 a rotation can be given to the male mold 35. In addition, a roller 41 always urged against a backside cam is arranged in a back member 27 of the piston 28. Furthermore, a female mold 37 having a cavity at a central front end is adapted to hold the [male mold 35] *article* firmly, and a press plate 39 is also provided at a piston 38 *slidably carried by a cylinder 36.*

When a cap 40 is molded between the male mold 35 and the female mold 37, both cylinders 26 and 36 are made to separate from each other, then the spring 31 acts to retreat the piston [29] *28* and in accordance with such movement, the projection 33 retreats back through the spiral groove 30 so that the male mold 35 is detached out of the cap 40 through rotation. Subsequently, the piston makes forward movement and the press plate 39 pushes [down] the cap 40 [through] *out of* the female mold 37.

[One edge of the plastic tape 25 is made thicker than another so that it is easy for the tape 25 held between two press molds to take a semi-circular course during the operation.]

The molding machine according to the present invention is characterized in that the plastic tape [25] in the [gel] *workable* condition is punched into the desired plastic packings in succession having the corresponding shape and size, and then subjected to pressing so as to give the stripes by way of the two press molds 17 and 17' secured at each end of the pistons 11 and 11' reciprocating within the cylinders 10 and 10'.

As above mentioned, this machine has 60 pairs of pistons, *approximately* half of which are [in constant working order] *concomitantly in operation producing articles.* While the shaft 7 is rotating at 5 r./m. speed, 300 packings are produced per minute. Then, there is an advantage of minimizing loss of materials and saving of man power, as the entire working is carried on automatically, except when plastic tape is supplied to the machine.

It will be apparent that the embodiment shown is only exemplary and that various modifications can be made in construction and arrangement within the scope of the invention as defined in the appended claims.

I claim:

1. A molding machine for producing plastic [packings] *articles* from a plastic tape in [gel] *workable* condition, said machine comprising a longitudinally extending shaft, means rotating said shaft, facing extrusion and coupling discs respectively transversely and concentrically mounted on said shaft, longitudinally extending cylinders respectively mounted on the proximate end faces of said discs in circumferentially spaced and opposingly paired relation, pistons respectively longitudinally slidably received within said cylinders, [spring] means respectively urging said pistons into retracted position in their cylinders wherein *at most one of* the pistons *protrudes from its cylinder* [of the coupling disc cylinder is recessed within the cylinder and the piston of the extrusion disc cylinder is flush therein], cooperating die [tools] *means* on the facing ends of said pistons, *said coupling disc die means forming a cavity,* and means operative on *the axially outer ends of* said pistons when said tape is interposed between respective pistons to first expel the extrusion disc piston [while the coupling disc piston is retracted and thereby punch a packing blank from] *to engage a portion of* said tape and convey [the tape] *said portion* into the [recess] *cavity* in the coupling disc [cylinder] *die means* and *ultimately* [then] to move [said pistons] *the formed article* to intermediate position [under pressure against each other] to [form] *position* the [packing] *article* [from the blank by said tools] *in a plane spaced from and parallel to said discs,* and finally to retract said pistons to release said [packing] *article in said plane, said portion being severed from said tape by movement of at least one of said pistons.*

2. A molding machine in accordance with claim 1, said die [tools respectively having] *means include* thickened outer peripheral portions with mating corrugations so as to corrugate the outer peripheral portion of the [packing] *article* and make the center portion thereof concavo-convex.

*3. A molding machine for producing plastic articles from a plastic tape in workable condition, said machine comprising a longitudinally extending shaft, means rotating said shaft, facing extrusion and coupling discs respectively transversely and concentrically mounted on said shaft, said discs having a plurality of axially extending circumferentially spaced opposed apertures formed in peripheral portions thereof, pistons longer than the thickness of said discs respectively longitudinally slidably received within said apertures, second means urging said pistons into retracted position in their disc apertures wherein at most one of the pistons protrudes axially inwardly from its disc, cooperating die means provided on the facing ends of said pistons, one of said die means forming a recess, and means operative on said pistons when said tape is interposed between respective pistons to first expel the extrusion disc piston to engage a portion of said tape and convey such portion into said recess to at least partly form the article, and then in association with said second means, to move said pistons and cooperating die means to intermediate positions with said*

*die means in a plane spaced from and parallel to both of said discs, and finally to control movement of said pistons to release said article in said plane, said portion being severed from said tape by movement of at least one of said pistons.*

*4. A molding machine as in claim 3 where said machine includes a frame, one of said discs has gear means carried by the periphery thereof, other gear means are carried by said frame and engage said first gear means, and a shaft engages said other gear means and is driven thereby whereby a power source controlled by and proportionate to the drive of said molding machine is provided.*

*5. A molding machine as in claim 3 wherein said machine includes a push-out means to engage an article and force it from said die means, and scraper means are provided to engage said die means and scrape any plastic therefrom.*

References Cited by the Examiner

The following references, cited by the Examiner, are of record in the patented file of this patent or the original patent.

UNITED STATES PATENTS

| | | | |
|---|---|---|---|
| 1,958,199 | 5/1934 | Morin. | |
| 1,959,612 | 5/1934 | Burke. | |
| 2,027,915 | 1/1936 | Kux | 18—20 |
| 2,260,456 | 10/1941 | Johnson | 18—20 |
| 2,354,029 | 7/1944 | Kingston | 18—20 |
| 2,363,808 | 10/1944 | Sayre. | |
| 2,440,366 | 4/1948 | Cropp | 18—20 |
| 2,862,232 | 12/1958 | Rekettye | 18—2 XR |
| 2,864,123 | 12/1958 | Gora | 18—20 XR |
| 2,984,862 | 5/1961 | Chabotte | 18—2 |

WILLIAM J. STEPHENSON, *Primary Examiner.*